US012797752B2

(12) United States Patent
Lin et al.

(10) Patent No.: US 12,797,752 B2
(45) Date of Patent: Nov. 17, 2026

(54) SERVER AND TERMINAL

(71) Applicant: 17LIVE Japan Inc., Tokyo (JP)

(72) Inventors: Yun-An Lin, Taipei City (TW); Te-Chung Huang, Taipei City (TW)

(73) Assignee: 17LIVE Japan Inc., Tokyo (JP)

( * ) Notice: Subject to any disclaimer, the term of this patent is extended or adjusted under 35 U.S.C. 154(b) by 247 days.

(21) Appl. No.: 18/440,729

(22) Filed: Feb. 13, 2024

(65) Prior Publication Data

US 2025/0058234 A1 Feb. 20, 2025

(30) Foreign Application Priority Data

Aug. 14, 2023 (JP) ................................ 2023-132089

(51) Int. Cl.
*A63F 13/86* (2014.01)
*A63F 13/87* (2014.01)
*H04N 21/2187* (2011.01)

(52) U.S. Cl.
CPC .............. *A63F 13/86* (2014.09); *A63F 13/87* (2014.09); *H04N 21/2187* (2013.01)

(58) Field of Classification Search
CPC ...... A63F 13/86; A63F 13/87; H04N 21/2187
See application file for complete search history.

(56) References Cited

U.S. PATENT DOCUMENTS 11,752,427 B2 * 9/2023 Owens .................... A63F 13/86 463/31
11,823,311 B2 * 11/2023 Li ...................... H04N 21/2187
11,917,214 B1 * 2/2024 Bell-Geddes ...... H04N 21/4668
11,943,516 B1 * 3/2024 Liu ........................ A63F 13/60
(Continued)

FOREIGN PATENT DOCUMENTS

JP 2021-057686 A 4/2021
JP 2022-043499 A 3/2022

OTHER PUBLICATIONS

Notice of Reasons for Refusal dated Nov. 21, 2023, issued in corresponding Japanese Patent Application No. 2023-132089 with English translation (10 pgs.).
(Continued)

*Primary Examiner* — Ankit B Doshi
(74) *Attorney, Agent, or Firm* — CUSHMAN PARTNERS LLC

(57) ABSTRACT

One object is to fully bring out attractiveness of competitive livestreams. A server includes a circuitry configured to: receive, from a first livestreamer terminal, first operation information of a first game generated based on input by a first livestreamer delivering a first livestream; receive, from a second livestreamer terminal, second operation information of a second game generated based on input by a second livestreamer delivering a second livestream; progress the first and second games based on the first and second operation information; transmit video data of the first and second livestreams and data of the first and second games together to a first viewer terminal of a first viewer of the first livestream and a second viewer terminal of a second viewer of the second livestream; receive a signal indicating use of a gift by the first viewer; and perform processing to negatively impact the second game.

9 Claims, 14 Drawing Sheets

(56) References Cited

U.S. PATENT DOCUMENTS

| | | | | |
|---|---|---|---|---|
| 2016/0184708 | A1* | 6/2016 | Ziaja | H04N 21/2407 463/31 |
| 2019/0058928 | A1* | 2/2019 | Halper | H04N 21/26258 |
| 2019/0182554 | A1* | 6/2019 | Schupak | H04N 21/4316 |
| 2020/0162796 | A1* | 5/2020 | Azuolas | H04N 21/4788 |
| 2022/0083126 | A1* | 3/2022 | Iwaki | G06F 3/0346 |
| 2022/0337639 | A1* | 10/2022 | Emile | G06F 3/0484 |
| 2023/0043174 | A1* | 2/2023 | Zhang | G06F 16/9035 |
| 2023/0074478 | A1* | 3/2023 | Hayashi | H04N 21/238 |
| 2023/0276101 | A1* | 8/2023 | Tashiro | H04N 21/4784 725/23 |
| 2024/0135038 | A1* | 4/2024 | Liu | H04N 21/4781 |
| 2024/0165512 | A1* | 5/2024 | Pasley | A63F 13/533 |

OTHER PUBLICATIONS

"New Racing Game '17GoKart (Ichinana GoKart)", 17LIVE Inc, with English translation (11 pgs.). URL:https://prtimes.jp/main/html/rd/p/000000419.000030133.html.

"How to use the 'VS Function'!", 17LIVE Inc, with English translation (19 pgs.). URL:https://jp.17.live/userguide/19206/.

* cited by examiner

| Stream ID | Livestreamer ID | Viewer ID |
|---|---|---|
| ST1 | LV1 | AU1, VR2, VR3, ⋯ |
| ST2 | LV2 | AU2, VR6, VR7, ⋯ |
| ST3 | LR3 | VR10, VR11, ⋯ |
| | | |

314

Fig. 4

| User ID | Points | Reward | VS Game Wins |
|---|---|---|---|
| LR1 | 3243 | 1500 | 5 |
| LR2 | 2510 | 800 | 2 |
| LR3 | 1803 | 0 | 0 |
| VR1 | 520 | 0 | 0 |
| US1 | 200 | 0 | 0 |
| US2 | 400 | 300 | 3 |
| | | | |

318

Fig. 5

| Gift ID | Reward to be Awarded | Price Points | Type |
|---|---|---|---|
| N1 | 90 | 100 | Normal |
| SP1 | 50 | 200 | Speed-up |
| BS1 | 100 | 1000 | Obstacle |
| BS2 | 300 | 3000 | Obstacle |
| BL1 | 500 | 5000 | Shock |
| | | | |

320

Fig. 6

| VS Livestream ID | First Stream ID | Second Stream ID | Score of First Livestreamer | Score of Second Livestreamer | Shock Meter of First Livestreamer | Shock Meter of Second Livestreamer | Remaining Time |
|---|---|---|---|---|---|---|---|
| PK001 | ST1 | ST2 | 210 | 250 | 15/100 | 90/100 | 1:30 |

322

Fig. 7

SERVER AND TERMINAL

CROSS-REFERENCE TO RELATED APPLICATIONS

This application is based on and claims the benefit of priority from Japanese Patent Applications Serial No. 2023-132089 (filed on Aug. 14, 2023), the contents of which are hereby incorporated by reference in its entirety.

TECHNICAL FIELD

The present disclosure relates to a server and a terminal.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video streaming services also became popular as storage costs were reduced.

And nowadays or in the Reiwa period (2019 to present), with the sophistication of smartphones and further improvements in network speed as typified by 5G, services that enable real-time communication through video, especially livestreaming services, are gaining recognition. The number of users of livestreaming services is expanding, especially among young people, as such services allow people to share the same good time even when they are in the separate locations from each other.

Japanese Patent Application Publication No. 2021-057686 ("the '686 Publication") discloses a livestream in which two livestreamers compete against each other through singing.

A competitive livestream by multiple livestreamers as described in the '686 Publication is an attractive content that can be expected to be exciting through competition. However, conventional competitive livestreams have limited ways for viewers to provide support, so the attractiveness of the competitive livestreams is not fully brought out.

SUMMARY

In view of the above, one object of the present disclosure is to provide a technology that can fully bring out the attractiveness of the competitive livestreams.

One aspect of the disclosure relates to a server. This server comprises a circuitry, wherein the circuitry is configured to: receive, from a first livestreamer terminal over a network, first operation information of a first game provided in a first livestream, the first operation information being generated based on an input by a first livestreamer delivering the first livestream; receive, from a second livestreamer terminal over the network, second operation information of a second game provided in a second livestream, the second operation information being generated based on an input by a second livestreamer delivering the second livestream; progress the first game based on the first operation information and progress the second game based on the second operation information; transmit video data of the first livestream, data of the first game, video data of the second livestream, and data of the second game together to a first viewer terminal of a first viewer of the first livestream and a second viewer terminal of a second viewer of the second livestream over the network; receive a signal indicating use of a gift by the first viewer from the first viewer terminal over the network; and perform processing to negatively impact a result of the second game in response to reception of the signal.

Another aspect of the disclosure relates to a terminal of a viewer of a first livestream. This terminal comprises: one or more processors; and memory storing one or more computer programs configured to be executed by the one or more processors, the one or more computer programs including instructions for: causing a livestreaming screen to be displayed on a display, the livestreaming screen containing: a first area displaying a video image of a first livestream on which an interface of a first game is superimposed; a second area displaying a video image of a second livestream on which an interface of a second game is superimposed; a first object for receiving use of a gift; and a second object showing a current value of a parameter configured to be updated by the use of the gift; and causing an effect to be displayed in the second area, the effect corresponding to a negative impact on the second game that is activated when a value of the parameter has reached a threshold.

Another aspect of the present disclosure relates to a terminal of a livestreamer of a first livestream. This terminal comprises: one or more processors; and memory storing one or more computer programs configured to be executed by the one or more processors, the one or more computer programs including instructions for: causing a livestreaming screen to be displayed on a display, the livestreaming screen containing a first area displaying a video image of a first livestream on which an interface of a first game is superimposed; starting to display an object for receiving an instruction to exercise a negative impact on a second game provided in a second livestream associated with the first livestream when a value of a parameter configured to be updated by use of a gift by a viewer of the first livestream has reached a threshold.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

Advantageous Effects

According to the aspects of the invention, it is possible to fully bring out the attractiveness of the competitive livestreams.

BRIEF DESCRIPTION OF THE DRAWINGS

FIG. 4 is a data structure diagram showing an example of a stream DB in FIG. 3.

FIG. 5 is a data structure diagram showing an example of a user DB in FIG. 3.

FIG. 6 is a data structure diagram showing an example of a gift DB in FIG. 3.

FIG. 7 is a data structure diagram showing an example of a VS livestream DB in FIG. 3.

DESCRIPTION OF THE PREFERRED EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a livestreaming system relating to an embodiment, a VS game livestream is provided in which livestreamers compete with each other based on the results of games in the livestream. The two livestreamers participating in the VS game livestream will play their respective games within their respective livestreams. In other words, instead of two livestreamers appearing in the same game space or virtual space and competing directly against each other, the game played by one livestreamer is basically independent of the game played by the other. One livestreamer will not appear in the other livestreamer's game, and vice versa. In the VS game livestream, the winner of the match-up is determined by comparing the results of the games played by the livestreamers.

A viewer of the VS game livestream is a viewer of a livestream provided by one of the two livestreamers participating in the VS game livestream in the system. Thus, in the VS game livestream, a livestreamer and his/her viewers are friends or a team, and they together form a community for defeating the opposing livestreamer.

In a livestreaming system according to an embodiment of the disclosure, a viewer of the VS game livestream can give gifts to a livestreamer as in regular livestreams. Gifts that can be used in the VS game livestream include gifts that can positively impact the result of the game played by the livestreamer of the livestream the giver is watching (hereinafter referred to as "helping gifts") and gifts that can negatively impact the result of the game played by the opposing livestreamer (hereinafter referred to as "attacking gifts"). Thus, with the use of attacking gifts in addition to helping gifts, there will be more means for viewers to support the livestreamer in the VS game livestream, making the VS game livestream more varied and enjoyable.

Figure 1:
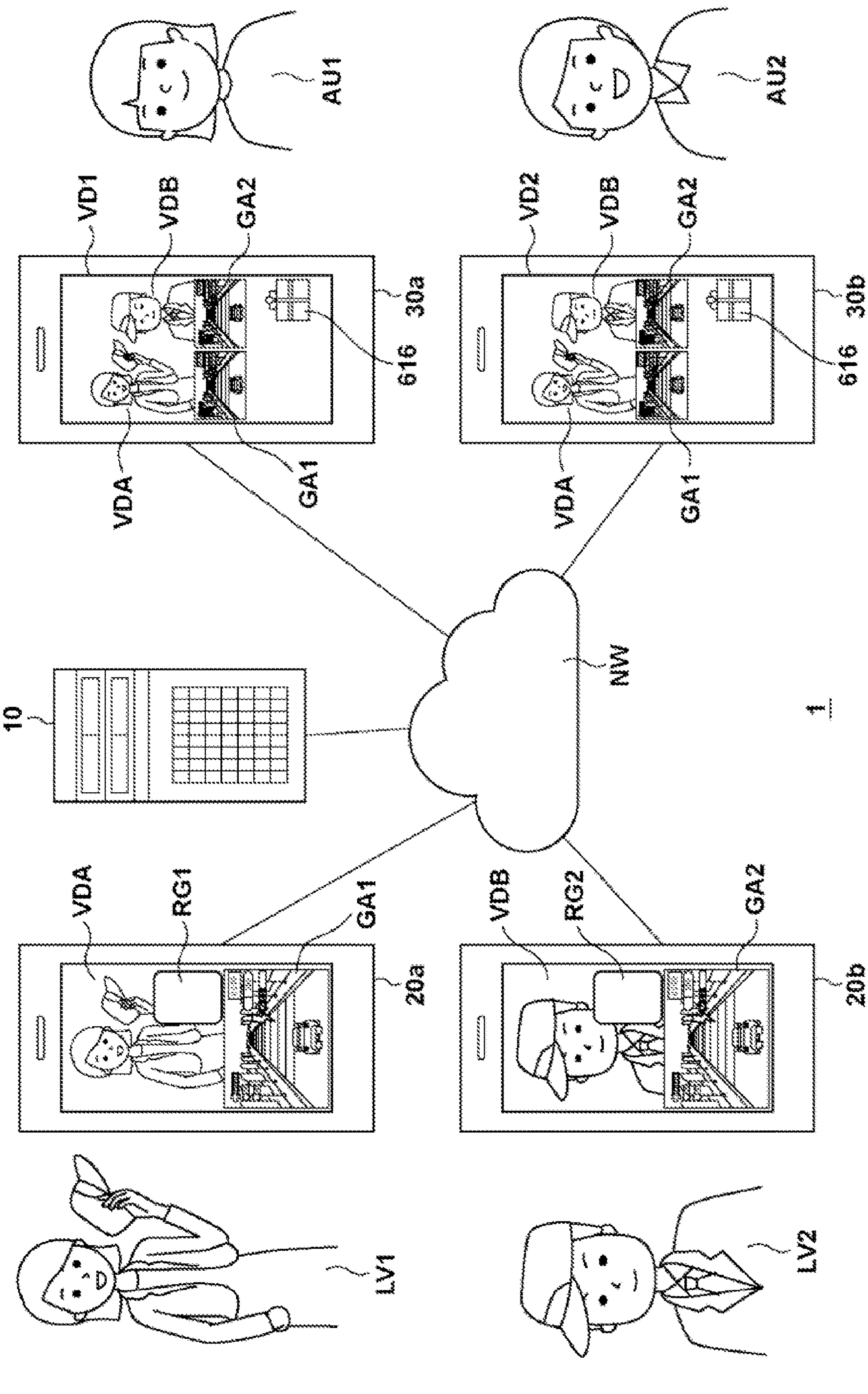
FIG. 1 schematically illustrates a configuration of a livestreaming system in one embodiment.

FIG. 1 schematically illustrates a configuration of a livestreaming system 1 in one embodiment. The livestreaming system 1 provides an interactive livestreaming service that allows a livestreamer LV (LV1, LV2, . . . ) (also referred to as a liver or streamer) and a viewer AU (also referred to as audience) (AU1, AU2, . . . ) to communicate in real time. As shown in FIG. 1, the livestreaming system 1 includes a server 10, user terminals 20 (20*a*, 20*b*, . . . ) on the livestreamers' side, and user terminals 30 (30*a*, 30*b*, . . . ) on the viewers' side. In addition to the livestreamers who are livestreaming and the viewers who are watching the livestreams, there may be users who have logged in to the livestreaming platform but are neither livestreaming nor watching the livestreams. Such users are herein referred to as active users. The livestreamers, the viewers, and the active users may be collectively referred to as users. The server 10 may be constituted by one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminals 20, and the user terminals 30 are interconnected so as to be able to communicate with each other over the various wired or wireless network NW.

The livestreaming system 1 involves the livestreamers LV, the viewers AU, and an administrator (not shown) who manages the server 10. The livestreamers LV are persons who broadcast contents in real time by recording the contents with their user terminals 20 and uploading them directly to the server 10. Examples of the contents may include the livestreamers' own songs, talks, performances, fortune-telling, gameplays, and any other contents. The administrator provides a platform for livestreaming contents on the server 10, and also mediates or manages real-time interactions between the livestreamers LV and the viewers AU. The viewers AU access the platform through their user terminals 30 to select and view a desired content. During livestreaming of the selected content, the viewer AU performs operations to comment, cheer, or ask fortune-telling via the user terminal 30, the livestreamer LV who is delivering the content responds to such a comment, cheer, or request and such response is transmitted to the viewer AU via video and/or audio, thereby establishing an interactive communication.

As used herein, the term "livestreaming" or "livestream" may mean a mode of data transmission that allows a content recorded at the user terminals 20 of the livestreamers LV to be played and viewed at the user terminals 30 of the viewers AU substantially in real time, or it may mean a live broadcast realized by such a mode of transmission. The livestreaming may be achieved using existing livestreaming technologies such as HTTP Live Streaming, Common Media Application Format, Web Real-Time Communications, Real-Time Messaging Protocol and MPEG DASH. The livestreaming includes a transmission mode in which, while the livestreamers LV are recording contents, the viewers AU can view the contents with a certain delay. The delay is acceptable as long as interaction between the livestreamers LV and the viewers AU can be at least established. Note that the livestreaming is distinguished from so-called on-demand type transmission, in which contents are entirely recorded and the entire data is once stored on the server, and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is reproduced in the user terminals 20 and 30, so that the users can view the livestreams. In this embodiment, it is assumed that between video data generation at the livestreamer's user terminal and video data reproduction at the viewer's user terminal, processing is performed on the video data to change its format, size, or specifications, and examples of such processing include compression, decompression, encoding, decoding, and transcoding. However, such processing does not substantially change the content (e.g., video images and audios) represented by the video data, so that the video data after such processing is herein described as the same as the video data before such processing. In other words, when video data is generated at the livestreamer's user terminal, transmitted via the server 10, and then reproduced at the viewer's user terminal, the video data generated at the livestreamer's user terminal, the video data that passes through the server 10, and the video data received and reproduced at the viewer's user terminal are all the same video data.

In the present embodiment, a plurality of livestreams respectively delivered by different livestreamers via different user terminals are provided to the viewers simultaneously via the same single VS game livestreaming screen. Additionally, each livestreamer plays the game within the livestream. This form of livestream is in the nature of a competition in game results among participating livestreamers and is herein referred to as a VS game livestream. In this embodiment, each livestreamer participating in the VS game livestream plays a single-player game simultaneously in his or her livestream, and the winner is determined by comparing the scores obtained within a predetermined period of time. In another embodiment, one of the livestreamers fulfilling a predetermined winning condition, such as the score reaching a predetermined value, may be determined as the winner.

In this embodiment, the game is a single-player game that allows support by the viewer, and in this game, the score increases or decreases depending on the operations of the player who is the livestreamer. The viewer can give a gift to the livestreamer, which will have the effect of providing the livestreamer with advantages in the game. The game is similar to 17GoKart, for example, described in "New Racing Game '17GoKart (Ichinana GoKart)", 17LIVE Inc, URL: https://prtimes.jp/main/html/rd/p/000000419.000030133.html (Non-patent Literature 1).

In the example shown in FIG. 1, the livestreamers LV1 and LV2 participate in a VS game livestream. The livestreamer LV1 delivers a livestream, where the livestreamer LV1 plays a game provided through the game interface GA1. The user terminal 20*a* of the livestreamer LV1 generates video data by recording images and sounds of the livestreamer LV1, and the generated data is transmitted to the server 10 over the network NW. The livestreamer LV2 delivers a livestream, where the livestreamer LV2 plays a game provided through the game interface GA2. The user terminal 20*b* of the livestreamer LV2 generates video data by recording images and sounds of the livestreamer LV2, and the generated data is transmitted to the server 10 over the network NW.

Each of the user terminal 30*a* of the viewer AU1 who is watching the livestream delivered by the livestreamer LV1 and the user terminal 30*b* of the viewer AU2 who is watching the livestream delivered by the livestreamer LV2 receives video data related to the livestream delivered by the livestreamer LV1, data of the game interface GA1, video data related to the livestream delivered by the livestreamer LV2, and data of the game interface GA2 over the network NW. The user terminals 30*a* and 30*b* reproduce the received video data to display video images VD1 and VD2, respectively, on the displays and output audio through the speakers. The video images VD1 and VD2 displayed on the user terminals 30*a* and 30*b*, respectively, are substantially the same. These video images each include an area for displaying a video image VDA captured by the user terminal 20*a* of the livestreamer LV1 and the game interface GA1, and an area for displaying a video image VDB captured by the user terminal 20*b* of the livestreamer LV2 and the game interface GA2. The video image VDA and the video image VDB are reproduced simultaneously on the user terminals 30 of the viewers and shown within the same VS game livestreaming screen on the displays. The audio outputted by the user terminal 30*a* and the audio outputted by the user terminal 30*b* are substantially the same, and include voices captured by the user terminal 20*a* of the livestreamer LV1 and voices captured by the user terminal 20*b* of the livestreamer LV2.

The user terminal 20*a* of the livestreamer LV1 receives the video image VDB of the livestreamer LV2 and the data of the game interface GA2 over the network NW, and displays them on the display together with the video image VDA of the livestreamer LV1. The user terminal 20*a* of the livestreamer LV1 displays the video image VDB of the livestreamer LV2 and the game interface GA2 in a small area RG1 in the picture-in-picture format. This allows the livestreamer LV1 to check his or her own livestream contents as well as the livestream contents and the progress of the game of the opponent. The user terminal 20*b* of the livestreamer LV2 receives the video image VDA of the livestreamer LV1 and the data of the game interface GA1 over the network NW, and displays them on the display together with the video image VDB of the livestreamer LV2. The user terminal 20*b* of the livestreamer LV2 displays the video image VDA of the livestreamer LV1 and the game interface GA1 in a small area RG2 in the picture-in-picture format.

The video images VD1 and VD2 displayed at the user terminals 30*a* and 30*b* of the viewers each include a gift icon 616 superimposed thereon. The gift icon 616 receives from the viewers AU1 and AU2 an instruction for use of a gift for the corresponding livestreamer LV1 or LV2. While watching the VS game livestream, the viewers AU1 and AU2 may tap the gift icon 616 to present a gift to the corresponding livestreamer LV1 or LV2.

Recording of the images and sounds at the user terminals 20 of the livestreamers LV and reproduction of the video data at the user terminals 30 of the viewers AU are performed substantially simultaneously. Once the viewer AU1 types a comment on the user terminal 30*a* in response to the livestreamer LV1 talking about his or her feelings about the game, the server 10 displays the comment on the user terminal 20*a* of the livestreamer LV1 in real time and also displays the comment on the user terminal 20*b* of the other livestreamer LV2 and the respective user terminals 30*a* and 30*b* of the viewers AU1 and AU2. When the livestreamer LV1 who has read the comment and mentions or talks about the contents of the comment, a video image and audio of the talk are outputted on the user terminal 20*b* of the livestreamer LV2 and the respective user terminals 30*a* and 30*b* of the viewers AU1 and AU2. This interactive action is recognized as establishment of a conversation between the livestreamer LV1 and the viewer AU1. In this way, the livestreaming system 1 realizes a livestream that enables the interactive communication, not one-way communication.

Figure 2:
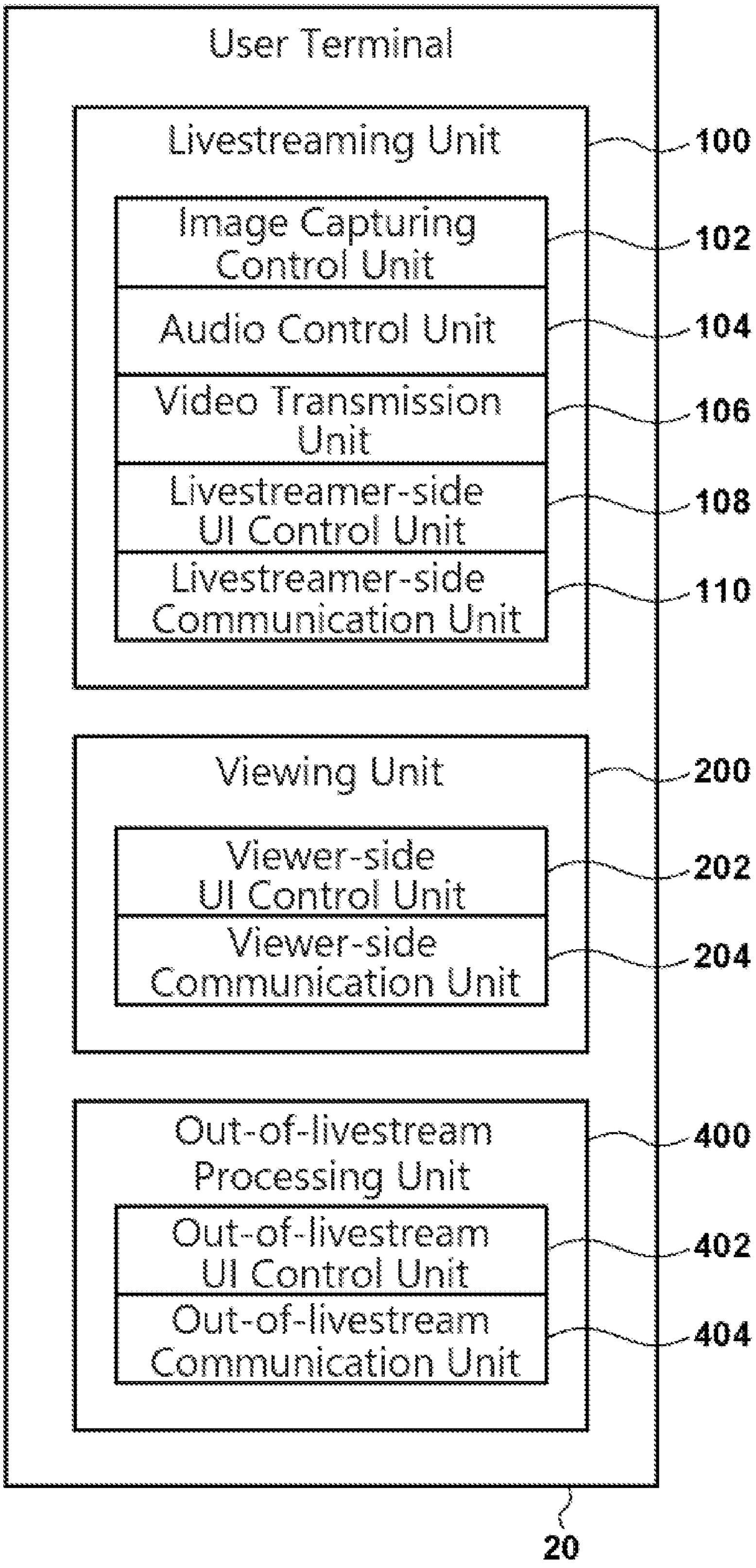
FIG. 2 is a block diagram showing functions and configuration of a user terminal shown in FIG. 1.

FIG. 2 is a block diagram showing functions and configuration of the user terminals 20 of FIG. 1. The user terminals 30 have the same functions and configuration as the user terminals 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The livestreamer LV and the viewers AU download and install a livestreaming application program (hereinafter referred to as a livestreaming application), onto the user terminals 20 and 30 from a download site over the network NW. Alternatively, the livestreaming application may be pre-installed on the user terminals 20 and 30. When the livestreaming application is executed on the user terminals 20 and 30, the user terminals 20 and 30 communicate with the server 10 over the network NW to implement various functions. Hereinafter, the functions implemented by (processors such as CPUs of) the user terminals 20 and 30 running the livestreaming application will be described as functions of the user terminals 20 and 30. These functions are realized in practice by the livestreaming application on the user terminals 20 and 30. In any other embodiments, these functions may be realized by a computer program written in a programming language such as HTML (HyperText Markup Language), which is transmitted from the server 10 to web browsers of the user terminals 20 and 30 over the network NW and executed by the web browsers.

The user terminal 20 includes a livestreaming unit 100 for recording the user's image and sound to generate and provide video data to the server 10, a viewing unit 200 for acquiring and reproducing the video data from the server 10, and an out-of-livestream processing unit 400 for processing requests made by active users. The user activates the livestreaming unit 100 to livestream, the viewing unit 200 to view a livestream, and the out-of-livestream processing unit 400 to look for a livestream, view a livestreamer's profile, or watch an archive. The user terminal having the livestreaming unit 100 activated is the livestreamer's terminal, i.e., the user terminal that generates video data, the user terminal having the viewing unit 200 activated is the viewer's terminal, i.e., the user terminal that reproduces video data, and the user terminal having the out-of-livestream processing unit 400 activated is the active user's terminal.

The livestreaming unit 100 includes an image capturing control unit 102, an audio control unit 104, a video transmission unit 106, a livestreamer-side UI control unit 108, and a livestreamer-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The livestreamer-side UI control unit 108 controls the UI for the livestreamer. The livestreamer-side UI control unit 108 is connected to a display (not shown in FIG. 2), and displays a video image on the display by reproducing the video data that is to be transmitted by the video transmission unit 106. The livestreamer-side UI control unit 108 superimposes a predetermined frame image on the video image. The frame image includes various user interface objects (hereinafter simply referred to as "objects") for receiving inputs from the livestreamer, comments entered by the viewers, and information obtained from the server 10. The livestreamer-side UI control unit 108 superimposes the game interface and the small area on the video image.

The livestreamer-side UI control unit 108 is connected to input means (not shown in FIG. 2) such as touch panels, keyboards, and displays, and obtains the livestreamer's input via the input means. The livestreamer-side UI control unit 108 receives the livestreamer's inputs made by the livestreamer tapping the objects. The livestreamer-side UI control unit 108 receives the livestreamer's inputs made by the livestreamer tapping or swiping the game interface.

The livestreamer-side communication unit 110 controls communication with the server 10 during a livestream. The livestreamer-side communication unit 110 transmits the content of the livestreamer's input that has been obtained by the livestreamer-side UI control unit 108 to the server 10 over the network NW. The livestreamer-side communication unit 110 transmits game operation information generated based on various inputs to the game interface made by the livestreamer to the server 10 over the network NW. The livestreamer-side communication unit 110 receives various information associated with the livestream from the server 10 over the network NW. The livestreamer-side communication unit 110 receives the opponent's video data and the game interface data in the VS game livestream.

The viewing unit 200 includes a viewer-side UI control unit 202 and a viewer-side communication unit 204. The viewer-side communication unit 204 controls communication with the server 10 during a livestream. The viewer-side communication unit 204 receives the data related to the VS game livestream from the server 10 over the network NW.

The viewer-side UI control unit 202 controls the UI for the viewer. The viewer-side UI control unit 202 is connected to a display and a speaker (not shown in FIG. 2), and reproduces the received video data so that the video images are displayed on the display and the sounds are output through the speaker. The state where the images and sounds are respectively output through the display and speaker can be referred to as "the video data is reproduced". The viewer-side UI control unit 202 superimposes a predetermined frame image on an image generated from the video data obtained from the server 10. The frame image includes various objects (including the gift icon 616) for receiving inputs from the viewer, comments entered by the viewer, and information obtained from the server 10. The viewer-side UI control unit 202 superimposes the game interface on the video image of the livestreamer.

The viewer-side UI control unit 202 is also connected to input means (not shown in FIG. 2) such as touch panels, keyboards, and displays, and obtains the viewer's input via the input means. The viewer-side communication unit 204 transmits the content of the viewer's input that has been obtained by the viewer-side UI control unit 202 to the server 10 over the network NW.

The out-of-livestream processing unit 400 includes an out-of-livestream UI control unit 402 and an out-of-livestream communication unit 404. The out-of-livestream UI control unit 402 controls a UI for the active user. For example, the out-of-livestream UI control unit 402 generates a livestream selection screen and shows the screen on the display. The livestream selection screen presents a list of livestreams to which the active user is currently invited to participate to allow the active user to select a livestream. The out-of-livestream UI control unit 402 generates a profile screen for any user and shows the screen on the display. The out-of-livestream UI control unit 402 plays back an archive generated by recording past livestreams.

The out-of-livestream communication unit 404 controls communication with the server 10 that takes place outside a livestream. The out-of-stream communication unit 404 receives, from the server 10 over the network NW, information necessary to generate the livestream selection screen, information necessary to generate the profile screen, and archived data. The out-of-livestream communication unit 404 transmits the content of the active user's input to the server 10 over the network NW.

Figure 3:
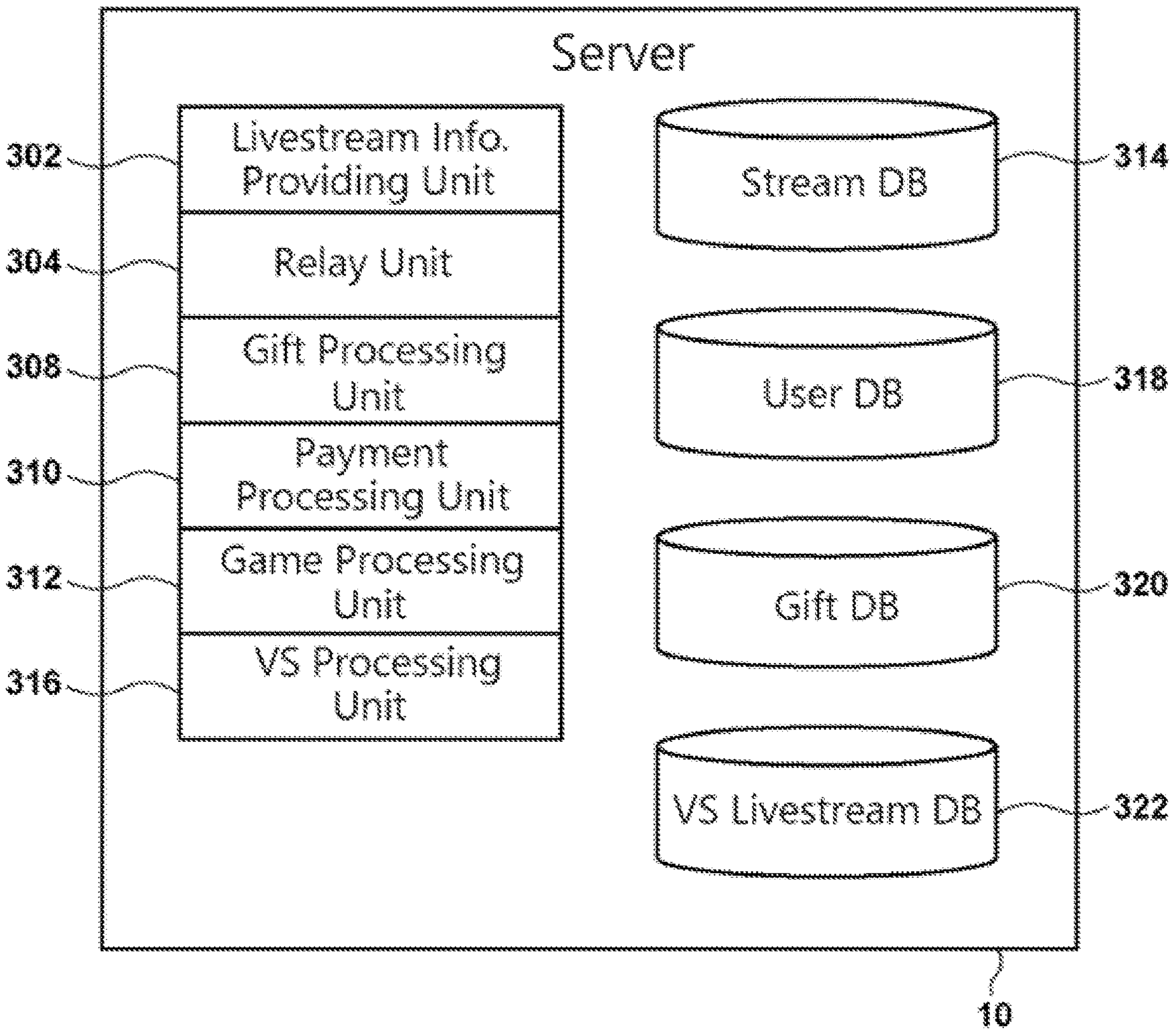
FIG. 3 is a block diagram showing functions and configuration of a server shown in FIG. 1.

FIG. 3 is a block diagram showing functions and configuration of the server 10 of FIG. 1. The server 10 includes a livestream information providing unit 302, a relay unit 304, a gift processing unit 308, a payment processing unit 310, a game processing unit 312, a VS processing unit 316, a stream DB 314, a user DB 318, a gift DB 320, and a VS livestream DB 322.

FIG. 4 is a data structure diagram showing an example of the stream DB 314 of FIG. 3. The stream DB 314 holds information about a livestream currently delivered on the livestreaming platform provided by the livestreaming system 1. The stream DB 314 stores a stream ID identifying a livestream on a livestreaming platform provided by the livestreaming system 1, a livestreamer ID, which is a user ID identifying the livestreamer who provides the livestream, and a viewer ID, which is a user ID identifying a viewer of the livestream, in association with each other.

In the livestreaming platform provided by the livestreaming system 1 of the embodiment, when a user delivers a livestream, the user is referred to as a livestreamer, and when the same user views a livestream delivered by another user, the user is referred to as a viewer. Therefore, the distinction between a livestreamer and a viewer is not fixed, and a user ID registered as a livestreamer ID at one time may be registered as a viewer ID at another time.

FIG. 5 is a data structure diagram showing an example of the user DB 318 of FIG. 3. The user DB 318 holds information regarding users. The user DB 318 stores a user ID identifying a user, points owned by the user, the reward awarded to the user, and the number of times the use has won in VS game livestreams, in association with each other.

The points are an electronic representation of value circulated in the livestreaming platform. The user can purchase the points using a credit card or other means of payment. The reward is an electronic representation of value defined in the livestreaming platform and is used to determine the amount of money the livestreamer receives from the administrator of the livestreaming platform. In the livestreaming platform, when a viewer gives a gift to a livestreamer within or outside a livestream, the viewer's points are consumed and, at the same time, the livestreamer's reward is increased by a corresponding amount.

FIG. 6 is a data structure diagram showing an example of the gift DB 320 of FIG. 3. The gift DB 320 holds information regarding gifts available for the viewers in relation to the livestreaming. A gift is a digital item or electronic data with the following characteristics:

- It can be purchased in exchange for the points or money, or can be given for free.
- It can be given by a viewer to a livestreamer. Giving a gift to a livestreamer is also referred to as using the gift or throwing the gift.
- Some gifts may be purchased and used at the same time, and some gifts may be used by the viewer at any time after purchased.
- When a viewer gives a gift to a livestreamer, the livestreamer is award a corresponding reward.
- When a gift is used, the use may trigger an effect associated with the gift. For example, an effect corresponding to the gift will appear on the livestreaming room screen.

The gift DB 320 stores: a gift ID identifying a gift; a reward to be awarded, which is a reward awarded to a livestreamer when the gift is given to the livestreamer; price points, which is the amount of points to be paid for use of the gift; and a type of the gift, in association with each other. A viewer is able to give a desired gift to a livestreamer by paying the price points of the desired gift while viewing the livestream. The payment of the price points may be made by appropriate electronic payment means. For example, the payment may be made by the viewer paying the price points to the administrator. Alternatively, bank transfers or credit card payments may be available. The administrator can freely determine the relationship between the reward to be awarded and the price points. For example, the administrator may determine that the reward to be awarded=the price points. Alternatively, points obtained by multiplying the reward to be awarded by a predetermined coefficient such as 1.2 may be set as the price points, or points obtained by adding predetermined fee points to the reward to be awarded may be set as the price points.

In this embodiment, there are four types of gifts: normal, speed-up, obstacle, and shock. A normal gift can be used for both VS game livestreams and normal livestreams, and can be used both when the livestreamer is playing the game and when he or she is not. A speed-up gift is a helping gift and can be used for both VS game livestreams and normal livestreams, but only when the livestreamer is playing the game. When a speed-up gift is used, the speed of the car operated by the livestreamer in the game is temporarily increased. This allows the livestreamer to score more within a given time period.

Both an obstacle gift and a shock gift are attacking gifts exclusive to VS game livestreams and can only be used in VS game livestreams. When used by a viewer in a VS game livestream, an obstacle gift negatively impacts the result of the game played by the opposing livestreamer of the livestreamer delivering the livestream that the viewer is watching. An obstacle gift impacts the game of the opposing livestreamer at the timing it is used by the viewer. In other words, the impact of the obstacle gift is activated without need of any action by the livestreamer delivering the livestream that the viewer is watching. Thus, the viewer can give the obstacle gift to interrupt the opposing livestreamer's game while allowing the associated livestreamer to focus on operating his or her own game. When used by a viewer in a VS game livestream, a shock gift increases by a predetermined amount a parameter (hereinafter referred to as the shock meter) associated with the livestreamer of the livestream that the viewer is watching. When the shock meter reaches a threshold value (hereafter referred to as "being full"), the livestreamer can negatively impact the opposing livestreamer's game. Specifically, an object (hereinafter referred to as the FIRE button) for receiving an instruction to exercise the shock appears in the livestreamer's game interface, i.e., the display of this object is started. When the livestreamer taps this object, the opposing livestreamer's operation is disabled for a certain period of time. The livestreamer can activate the shock at any timing he or she desires, which makes his or her VS game livestream more advantageous.

FIG. 7 is a data structure diagram presenting an example of the VS livestream DB 322 in FIG. 3. The VS livestream DB 322 holds information about VS livestreams currently delivered on the livestreaming platform provided by the livestreaming system 1. The VS livestream DB 322 stores a VS livestream ID that identifies a VS game livestream, a first stream ID that identifies a livestream of one of the two livestreamers participating in the VS game livestream, a second stream ID that identifies a livestream of the other of the two livestreamers participating in the VS game livestream, a score in the game of the one livestreamer, a score in the game of the other livestreamer, a value of the shock meter of the one livestreamer, a value of the shock meter of the other livestreamer, and a remaining time of the VS game livestream, in association with each other. In this embodiment, an operation period is set for the VS game livestream, and the remaining time indicates the time remaining before the VS game livestream is ended. In the case where the length of the operation period is five minutes, and the VS game livestream has currently continued for three minutes and 30 seconds, the remaining time is five minutes minus three minutes and 30 seconds, or one minute and 30 seconds.

In the VS game livestream, a viewer is recognized on the server 10 as a viewer for one of the livestreamers participating in the VS game livestream. Taking the example shown in FIG. 1, although the first viewer AU1 is watching both of the livestreams delivered by the livestreamers LV1 and LV2 in a VS livestream, the viewer AU1 is recognized as the viewer for the livestreamer LV1 but not as the viewer for the livestreamer LV2. This recognition in the server 10 is accomplished by the VS livestream DB 322 associating two stream IDs for each VS game livestream. More specifically, in the VS livestream DB 322, the same VS livestream ID is associated with two stream IDs, which means that two livestreamers (corresponding to the two stream IDs) compete in the VS game livestream. Furthermore, in the stream DB 314, these two stream IDs are each associated with at least one viewer ID. Thus, in the stream DB 314, each of these viewers is associated with one of the livestreamers competing in the VS game livestream. This means that the server 10 can recognize each viewer as a viewer of the livestream delivered by the associated one of the livestreamers.

Referring again to FIG. 3, upon reception of a notification from the user terminal 20 of a livestreamer that the livestreamer starts a livestream over the network NW, the livestream information providing unit 302 enters in the stream DB 314 a stream ID identifying this livestream and the livestreamer ID of the livestreamer who delivers the livestream. When the livestream information providing unit 302 receives a request for information about livestreams from the out-of-livestream communication unit 404 of a user terminal of an active user over the network NW, the livestream information providing unit 302 refers to the stream DB 314 and makes a list of currently available livestreams. The livestream information providing unit 302 transmits the generated list to the requesting user terminal over the network NW. The out-of-livestream UI control unit 402 of the requesting user terminal generates a livestream selection screen based on the received list and shows the livestream selection screen on the display of the user terminal.

Once the out-of-livestream UI control unit 402 of the user terminal receives the active user's selection of the livestream on the livestream selection screen, the out-of-livestream UI control unit 402 generates a livestream request including the stream ID of the selected livestream, and transmits the livestream request to the server 10 over the network NW. The livestream information providing unit 302 starts to provide, to the requesting user terminal, the livestream identified by the stream ID included in the received livestream request. The livestream information providing unit 302 updates the stream DB 314 such that the user ID of the active user of the requesting user terminal is included in the viewer IDs associated with the stream ID. In this way, the active user can be a viewer of the selected livestream.

The relay unit 304 relays the video data from the livestreamer-side user terminal 20 to the viewer-side user terminal 30 in the livestream started by the livestream information providing unit 302. The relay unit 304 receives from the viewer-side communication unit 204 a signal that represents user input by a viewer during the livestream or reproduction of the video data. The signal that represents user input may be an object specifying signal for specifying an object displayed on the display of the user terminal 30, and the object specifying signal includes the viewer ID of the viewer, the livestreamer ID of the livestreamer delivering the livestream that the viewer watches, and an object ID that identifies the object. When the object is a gift icon, the object ID is a gift ID. The object specifying signal in that case is a gift use signal indicating that the viewer uses a gift for the livestreamer. Similarly, the relay unit 304 receives from the livestreamer-side communication unit 110 of the livestreaming unit 100 in the user terminal 20 a signal that represents user input by the livestreamer during reproduction of the video data, such as the object specifying signal.

The gift processing unit 308 updates the user DB 318 so as to increase the reward for the livestreamer depending on the reward to be awarded of the gift identified by the gift ID included in the gift use signal. Specifically, the gift processing unit 308 refers to the gift DB 320 to specify a reward to be awarded for the gift ID included in the received gift use signal. The gift processing unit 308 then updates the user DB 318 to add the specified reward to be awarded to the reward for the livestreamer ID included in the gift use signal.

The payment processing unit 310 processes payment of a price of the gift by the viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

The game processing unit 312 performs processing related to provision of games within the livestream. The game processing unit 312 performs processing related to the game played by the livestreamer within the ongoing livestream. The game processing unit 312 generates data for displaying the game interface and transmits the data to the livestreamer's user terminal 20 and the viewer's user terminal 30. The game processing unit 312 receives the operation information about the livestreamer's operation on the game interface. The game processing unit 312 progresses the game based on the operation information.

A VS game livestream will now be described in accordance with FIG. 1. The game processing unit 312 receives, from the user terminal 20*a* of a first livestreamer LV1 over the network NW, first operation information of a first game provided in a first livestream, which is generated based on the input by the first livestreamer LV1 delivering the first livestream. The game processing unit 312 receives, from the user terminal 20*b* of a second livestreamer LV2 over the network NW, second operation information of a second game provided in a second livestream, which is generated based on the input by the second livestreamer LV2 delivering the second livestream. The game processing unit 312 progresses the first game based on the received first operation information and progresses the second game based on the received second operation information. The game processing unit 312 may provide the first game using the technique disclosed in Non-patent Literature 1. The game processing unit 312 may provide the second game using the technique disclosed in Non-patent Literature 1.

The game processing unit 312 progresses the first and second games at least partially simultaneously. When a VS game livestream is set up for the first livestreamer LV1 and the second livestreamer LV2, the game processing unit 312 synchronizes the start of the first and second games, or starts the first and second games simultaneously. The game processing unit 312 sets the common operation period for the first and second games. When the operation period has elapsed, the game processing unit 312 ends the first and second games simultaneously. In another embodiment, the game processing unit 312 may end the first and second games when either the first livestreamer LV1 or the second livestreamer LV2 fulfills a winning condition. Alternatively, yet another embodiment may employ both the common operation period and the winning condition. In this case, if either livestreamer fulfills the winning condition within the operation period, that livestreamer wins, and the first and second games are ended at that point. If neither livestreamer fulfills the winning condition within the operation period, the first and second games are ended when the operation period has elapsed, and the winner is determined by comparing the scores.

The game processing unit 312 performs processing to negatively impact the result of the second game played by the second livestreamer LV2 in response to the receipt of a gift use signal including a gift ID of an attacking gift from the user terminal 30*a* of the first viewer AU1 watching the first livestream. The game processing unit 312 performs processing to negatively impact the result of the first game played by the first livestreamer LV1 in response to the receipt of a gift use signal including a gift ID of an attacking gift from the user terminal 30*b* of the second viewer AU2 watching the second livestream. The processing of an attacking gift performed by the game processing unit 312 will be described later.

The VS processing unit 316 may receive a VS game starting request for requesting that a VS game livestream be set from any of the user terminals 20 of the livestreamers over the network NW and newly issue a VS livestream ID. The VS game starting request is designed for requesting that an invitation be sent to a designated or randomly selected opponent, the invitation being configured to invite the opponent to deliver a livestream together with the requesting livestreamer on the same screen. The VS processing unit 316 sends a VS game invitation for a VS game livestream to the user terminal 20 of the livestreamer identified by the livestreamer ID of the opponent selected by the requesting livestreamer, which is included in the VS game starting request. Alternatively, the VS processing unit 316 may randomly select an opponent if no opponent is selected by the livestreamer.

Sending an invitation for a VS game livestream, and starting, keeping and controlling a VS game livestream, which are performed by the VS processing unit 316, may be realized using the VS functionality techniques described in, for example, "How to use the 'VS Function'!", 17LIVE Inc, URL: https://jp.17.live/userguide/19206/. If the invitation is accepted, the VS processing unit 316 registers the stream ID of the livestream delivered by the requesting livestreamer and the stream ID of the livestream delivered by the opponent who has accepted the invitation in the VS livestream DB 322 in association with the above-mentioned VS livestream ID. During the VS game livestream, the VS processing unit 316 transmits (1) video data of the livestream of one participating livestreamer, (2) data of the game played by the one livestreamer, (3) video data of the livestream of the other participating livestreamer, and (4) data of the game played by the other livestreamer, together to the user terminals of the viewers of the one livestreamer and the user terminals of the viewers of the other livestreamer over the network NW. The VS processing unit 316 updates the game scores, the shock meters, and the remaining time in the VS livestream DB 322 as appropriate while the VS game livestream is in progress.

When the operation period of the VS game livestream has elapsed and the game is ended, the VS processing unit 316 determines one of the livestreamers as the winner by comparing the result of one livestreamer's game with the result of the other livestreamer's game. When the operation period has elapsed since the VS game livestream started and the game of each participating livestreamer is ended at the same time, the VS processing unit 316 refers to the VS livestream DB 322 to identify and compare the scores of the livestreamers at the end of the game. The VS processing unit 316 determines the livestreamer having the higher score value as the winner in the VS game livestream. The VS processing unit 316 updates the user DB 318 so as to increment the number of VS game wins of the livestreamer determined as the winner.

Figure 8:
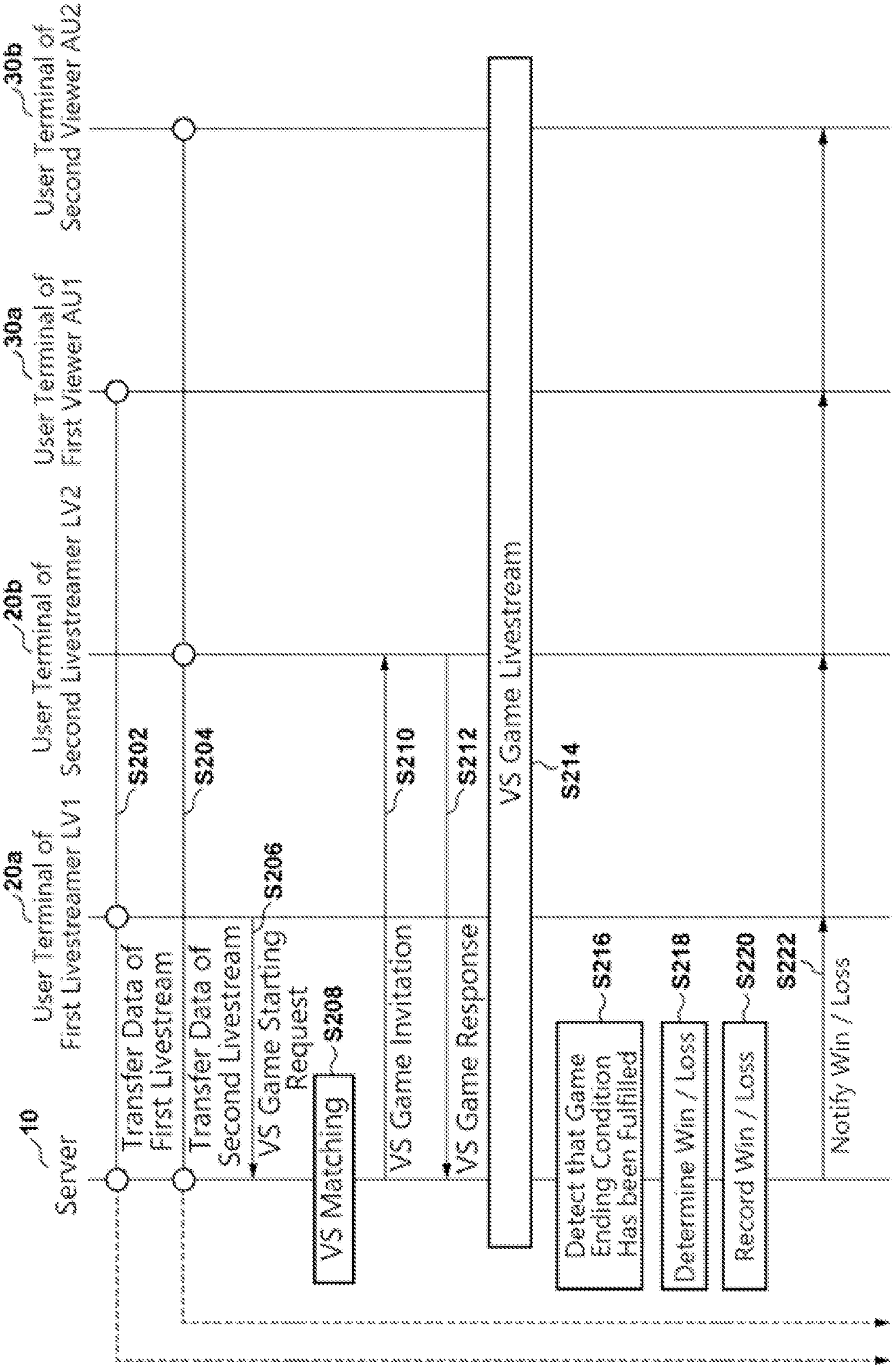
FIG. 8 is a chart showing a flow of a process from the start to the end of a VS livestream.

The operation of the livestreaming system 1 with the above configuration will be now described. FIG. 8 is a chart showing a flow of a process from the start to the end of a VS livestream. FIG. 8 corresponds to the example shown in FIG. 1. It is assumed that the first livestreamer LV1 has already started the first livestream before the VS game livestream starts, and the first viewer AU1 has joined the first livestream and is watching it. The server 10 relays the transmission of video data from the user terminal 20*a* of the first livestreamer LV1 to the user terminal 30*a* of the first viewer AU1, and receives comments and gift use signals from the user terminal 30*a* (S202). While the process described in FIG. 8 is in progress, data transfer relating to the first livestream continues. In addition, the second livestreamer LV2 has already started the second livestream before the VS game livestream starts, and the second viewer AU2 has joined the second livestream and is watching it. The server 10 relays the transmission of video data from the user terminal 20*b* of the second livestreamer LV2 to the user terminal 30*b* of the second viewer AU2, and receives comments and gift use signals from the user terminal 30*b* (S204). While the process described in FIG. 8 is in progress, data transfer relating to the second livestream continues.

On reception of an instruction to set up a VS game livestream from the first livestreamer LV1, the user terminal 20*a* generates a VS game starting request and transmits it to the server 10 over the network NW (S206). When receiving the VS game starting request, the VS processing unit 316 performs a VS matching process to determine a candidate opponent of the first livestreamer LV1 (S208). In this example, the second livestreamer LV2 is determined as a first candidate. The VS processing unit 316 sends a VS game invitation over the network NW to the user terminal 20*b* of the second livestreamer LV2, who has been determined as the first candidate (S210). The second livestreamer LV2 performs the operation to accept the invitation on the user terminal 20*b*. The user terminal 20*b* of the second livestreamer LV2 generates a VS game response indicating acceptance of the invitation and transmits it to the server 10 over the network NW (S212). If the second livestreamer LV2 rejects the invitation, a VS game response indicating the rejection of the invitation is generated. In this case, the VS processing unit 316 selects another candidate and performs the same invitation process.

When receiving the VS game response indicating acceptance, the VS processing unit 316 and the game processing unit 312 generate a new entry of VS game livestream in the VS livestream DB 322 and control the VS game livestream as described above (S214). The user terminals of the viewers display the VS game livestreaming screen described later and receive instructions from the viewers for use of gifts. The user terminals of the livestreamers display the VS game operating screen described later and receives game operation information from the livestreamers. The game processing unit 312 progresses the game based on the operation information and the gift use information. The game processing unit 312 accesses the VS livestream DB 322 to update the scores, shock meter values, and remaining time.

The game processing unit 312 detects that an ending condition of the game in the VS game livestream has been fulfilled (S216). The ending condition is fulfilled when the operation period has elapsed. The VS processing unit 316 determines the winner by comparing the result of the first game played by the first livestreamer with the result of the second game played by the second livestreamer (S218). The VS processing unit 316 records the win and loss in the user DB 318 (S220). The VS processing unit 316 notifies the win and loss to the first livestreamer LV1, the first viewer AU1, the second livestreamer LV2, and the second viewer AU2, who participated in the VS game livestream (S222). The VS processing unit 316 transmits information indicating the win and loss to the user terminals 20*a*, 20*b*, 30*a*, and 30*b* over the network NW. The VS processing unit 316 then ends the VS game livestream. The VS processing unit 316 deletes the entry corresponding to the ended VS game livestream from the VS livestream DB 322. After the VS game livestream is ended, the first livestreamer LV1 resumes the first livestream and the first viewer AU1 remains a viewer of the first livestream, while the second livestreamer LV2 resumes the second livestream and the second viewer AU2 remains a viewer of the second livestream. This is accomplished by keeping the information relating to each livestream in the stream DB 314 after the VS game livestream has been ended.

Figure 9:
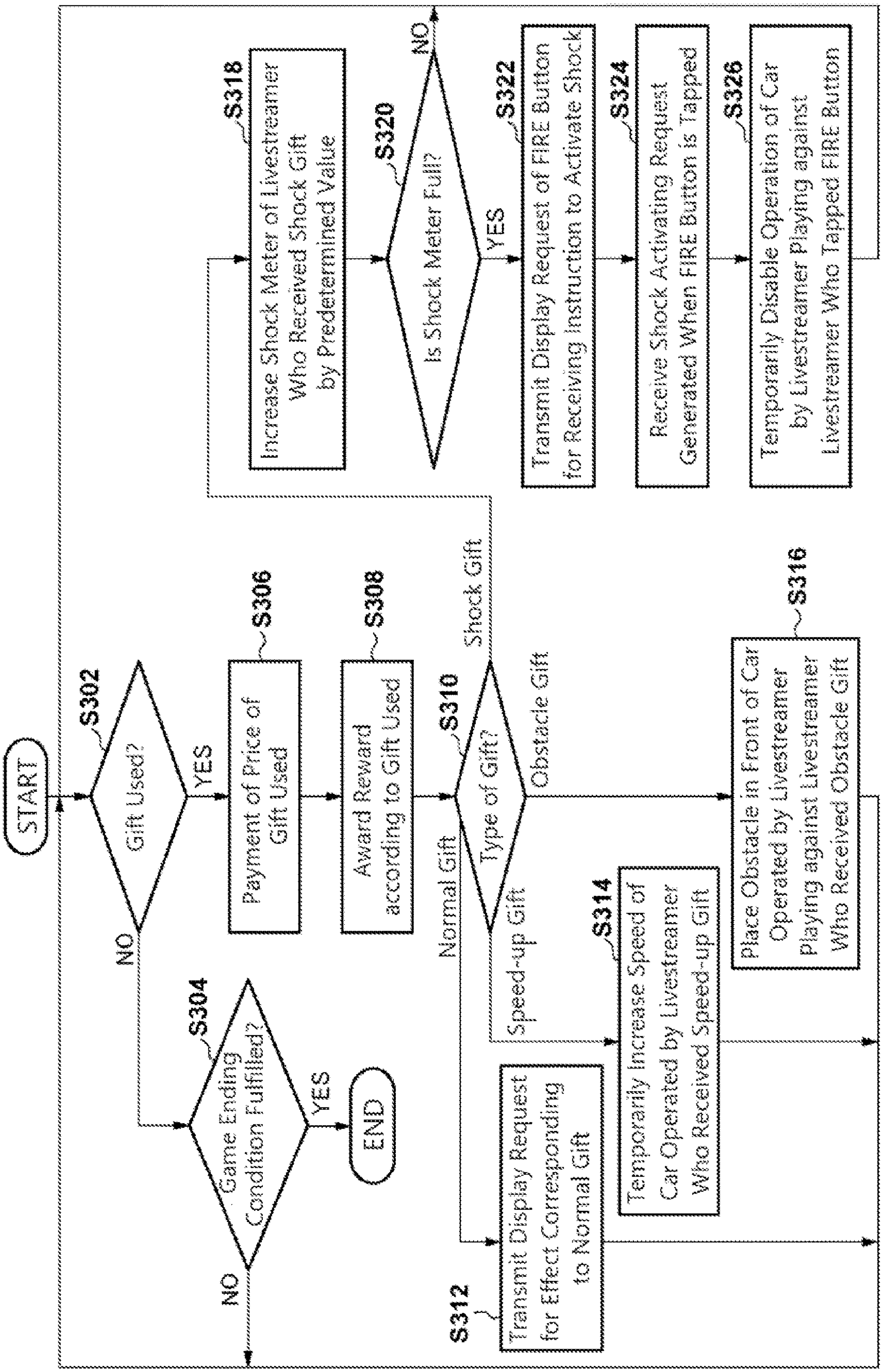
FIG. 9 is a flowchart showing a flow of a process related to use of a gift in a VS game livestreaming step in FIG. 8.

FIG. 9 is a flowchart showing a flow of a process related to use of a gift in the VS game livestreaming step S214 in FIG. 8. The VS processing unit 316 determines whether a gift has been used in the VS game livestream (S302). When receiving a gift use signal from the user terminal of one of the viewers watching the VS game livestream, the VS processing unit 316 determines that a gift has been used. If it is determined that no gift has been used (N in S302), the VS processing unit 316 determines whether the ending condition of the game has been fulfilled (S304). If it is determined that the ending condition has been fulfilled (Y in S304, corresponding to step S216 in FIG. 8), the process proceeds to step S218 in FIG. 8.

If it is determined in step S302 that a gift has been used (Y in S302), that is, if a gift use signal has been received, the payment processing unit 310 processes payment of the price of the gift by the viewer who used the gift (S306). The gift processing unit 308 awards the livestreamer a reward according to the gift used (S308). The gift processing unit 308 identifies the type of the gift used (S310). The gift processing unit 308 refers to the gift DB 320 to obtain the type of the gift identified by the gift ID included in the gift use signal received in step S302.

If the type of the gift identified in step S310 is "normal" ("Normal Gift" in S310), the gift processing unit 308 transmits a request for displaying the effect corresponding to the identified normal gift over the network NW to the user terminal of the livestreamer identified by the livestreamer ID included in the gift use signal and to the user terminal of the viewer of the livestream delivered by this livestreamer (S312). The process then returns to step S302.

If the type of the gift identified in step S310 is "speed-up" ("Speed-up Gift" in S310), the game processing unit 312 temporarily increases the speed of the car operated by the livestreamer who received the speed-up gift (S314). This provides a positive impact on the result of the game played by the livestreamer, such as allowing the livestreamer to score more points in the game or to finish earlier. The process then returns to step S302.

If the type of the gift identified in step S310 is "obstacle" ("Obstacle Gift" in S310), the game processing unit 312 places the obstacle in front of the car operated by the livestreamer who is playing against the livestreamer who received the obstacle gift (S316). This provides a negative impact on the result of the game played by the opposing livestreamer, such as the opposing livestreamer scoring fewer points in the game or finishing later. The process then returns to step S302.

If the type of the gift identified in step S310 is "shock" ("Shock Gift" in S310), the game processing unit 312 updates the value of the shock meter. More specifically, the game processing unit 312 increases the shock meter of the livestreamer who received the shock gift by a predetermined value (S318). The game processing unit 312 determines whether the shock meter has reached a predetermined upper limit or has been full (S320). If the upper limit has not been reached (N in S320), the process returns to step S302. If the upper limit has been reached (Y in S320), the game processing unit 312 negatively impacts the result of the game played by the opposing livestreamer playing against the livestreamer who received the shock gift. More specifically, the game processing unit 312 transmits a request for displaying a FIRE button for receiving an instruction to activate the shock over the network NW to the user terminal of the livestreamer who received the shock gift (the livestreamer identified by the livestreamer ID included in the gift use signal received in step S302) (S322). The game processing unit 312 then starts to wait for an instruction to exercise an impact by the livestreamer who received the shock gift.

The game processing unit 312 receives from this livestreamer's user terminal over the network NW a request for activating the shock, which is generated when the FIRE button on this livestreamer's user terminal is tapped (S324).

The game processing unit 312 receives the request for activating the shock as an instruction to exercise a negative impact by the livestreamer. When receiving the request for activating the shock, the game processing unit 312 temporarily disables the operation of the car by the livestreamer who is playing against the livestreamer who tapped the FIRE button (S326). This provides a negative impact on the result of the game played by the opposing livestreamer, such as the opposing livestreamer scoring fewer points in the game or finishing later. The process then returns to step S302.

Figure 10:
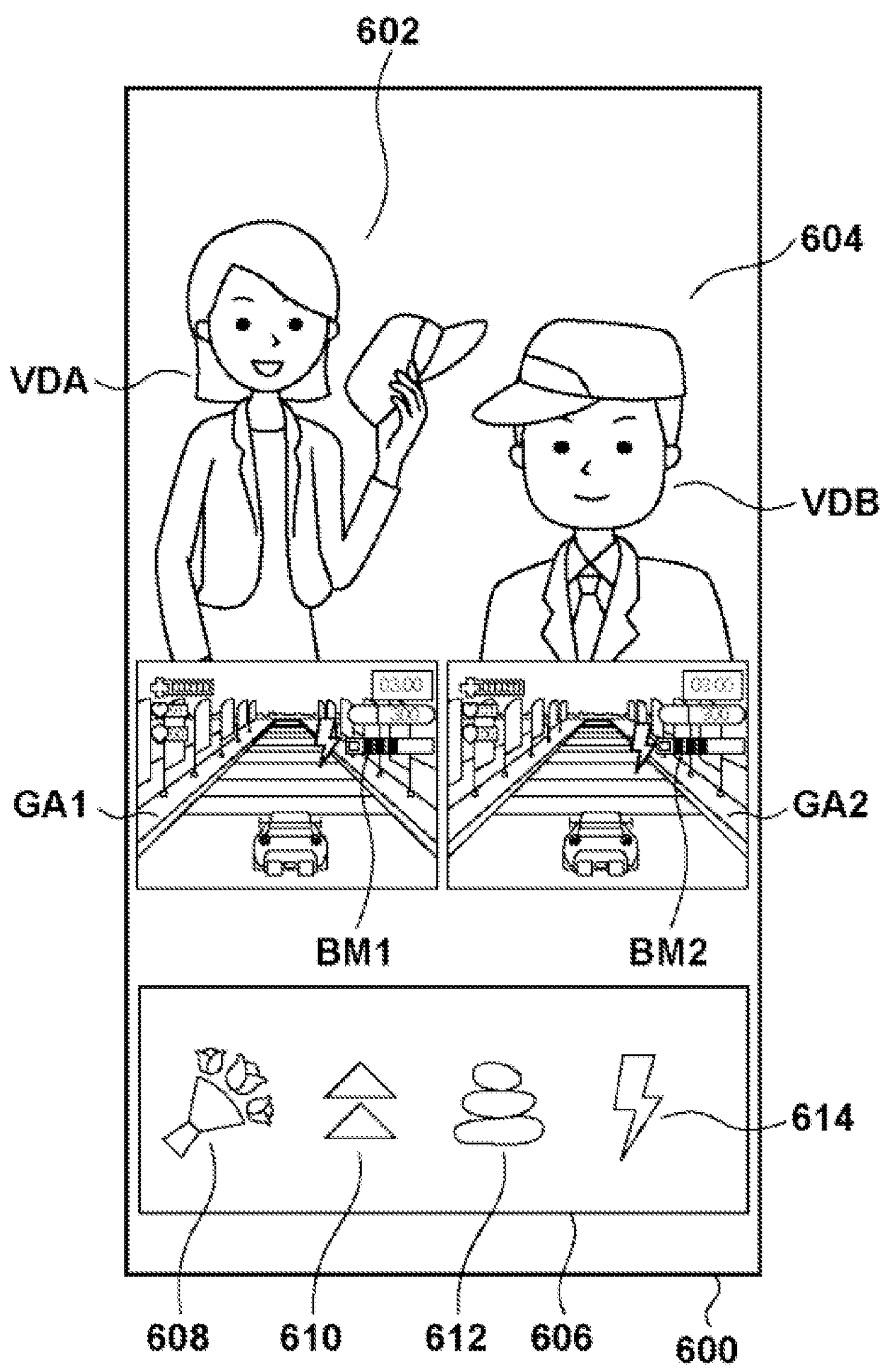
FIG. 10 is a representative screen image of a VS game livestreaming screen displayed on a display of a user terminal of a viewer watching the VS game livestream.

FIG. 10 is a representative screen image of a VS game livestreaming screen displayed on the display of the user terminal of the viewer watching the VS game livestream. FIG. 10 corresponds to the example shown in FIG. 1. When the viewer taps the gift icon 616 in FIG. 1, the VS game livestreaming screen 600 of FIG. 10 appears on the display of this viewer's user terminal. The VS game livestreaming screen 600 of FIG. 10 may be displayed on the display of the user terminal 30*a* of the first viewer AU1 or on the display of the user terminal 30*b* of the second viewer AU2. The VS game livestreaming screen 600 is hereinafter described as being displayed on the display of the user terminal 30*a* of the first viewer AU1. The VS game livestreaming screen 600 contains the video images VDA and VDB generated on the user terminals 20*a* and 20*b* of the livestreamers LV1 and LV2 playing against each other in the VS game livestream. These video images VDA and VDB are shown on the same screen in real time. The VS game livestreaming screen 600 also contains the game interfaces GA1 and GA2 of the games played by the livestreamers LV1 and LV2.

The VS game livestreaming screen 600 contains a first video image display area 602, a second video image display area 604, and a gift display area 606. In the first video image display area 602, the game interface GA1 of the first game played by the first livestreamer LV1 is superimposed on the video image VDA of the livestream of the first livestreamer LV1 participating in the VS game livestream. In the second video image display area 604, the game interface GA2 of the second game played by the second livestreamer LV2 is superimposed on the video image VDB of the livestream of the second livestreamer LV2 participating in the VS game livestream. In the gift display area 606, gift objects of various gifts that can be used in the VS game livestream are displayed. The gift objects are objects for receiving the use of the corresponding gifts. The video image VDA is obtained by reproducing the video data of the livestream of the first livestreamer LV1 received from the server 10. The video image VDB is obtained by reproducing the video data of the livestream of the second livestreamer LV2 received from the server 10.

The game interface GA1 contains a first shock meter display area BM1 that shows the current value of the shock meter of the first livestreamer LV1. The game interface GA2 contains a second shock meter display area BM2 that shows the current value of the shock meter of the second livestreamer LV2. The value of the shock meter of the first livestreamer LV1 is updated or increased by the use of a shock gift by the viewer of the livestream of the first livestreamer LV1 (e.g., the first viewer AU1). The value of the shock meter of the second livestreamer LV2 is updated or increased by the use of a shock gift by the viewer of the livestream of the second livestreamer LV2 (e.g., the second viewer AU2).

The gift display area 606 contains a normal gift object 608 representing a normal gift, a speed-up gift object 610 representing a speed-up gift, an obstacle gift object 612 representing an obstacle gift, and a shock gift object 614 representing a shock gift. When a tap on one of the gift objects is detected, the user terminal 30*a* generates a corresponding gift use signal and transmits it to the server 10 over the network NW. The viewer ID included in this gift use signal is the user ID of the first viewer AU1, and the livestreamer ID included in this gift use signal is the user ID of the first livestreamer LV1. Since the first viewer AU1 of the user terminal 30*a* displaying the VS game livestreaming screen 600 is a viewer of the first livestream of the first livestreamer LV1, it is unnecessary to inquire "to whom" the gift should be given. Thus, in this embodiment, when a gift is used during a VS game livestream, the viewer is not asked which livestreamer to give the gift to.

The first viewer AU1 may tap the obstacle gift object 612 in the gift display area 606 on the VS game livestreaming screen 600 of FIG. 10, and the viewer-side UI control unit 202 of the user terminal 30*a* receives designation of the obstacle gift object 612 by the first viewer AU1. The viewer-side communication unit 204 of the user terminal 30*a* generates a gift use signal including the gift ID of the obstacle gift represented by the designated obstacle gift object 612 and transmits the gift use signal to the server 10. The gift processing unit 308 and the payment processing unit 310 perform the processing of price payment and reward awarding for the obstacle gift as described above. The game processing unit 312 places an obstacle in front of the car operated by the second livestreamer LV2 in the second game played by the second livestreamer LV2. The game interface GA2 of the VS game operating screen displayed on the user terminal 20*b* of the second livestreamer LV2 displays the obstacle placed therein. The second livestreamer LV2 tries to dodge this obstacle by operating his or her car. If the dodge fails and the car touches the obstacle, then the car slows down, the car pauses, or the score of the second livestreamer LV2 in the second game is reduced. This is also reflected in the game interface GA2 in the second video image display area 604 of the VS game livestreaming screen 600, so both the first viewer AU1, the giver of the obstacle gift, and the second viewer AU2, the viewer for the second livestreamer LV2, can see the reaction of the second livestreamer LV2 to the obstacle.

Figure 11:
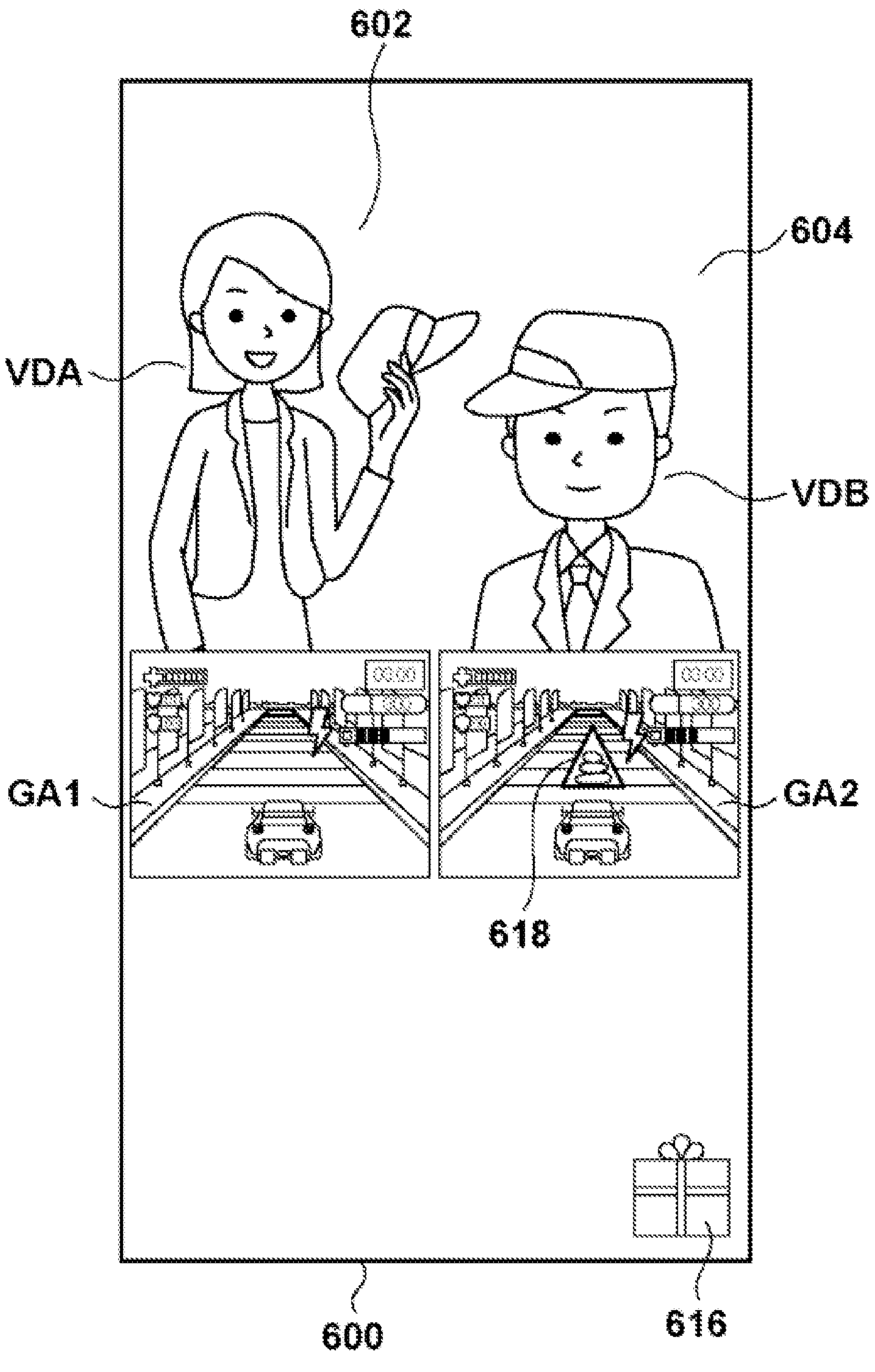
FIG. 11 is a representative screen image of the VS game livestreaming screen displayed on the display of a user terminal of a first viewer who has given an obstacle gift.

FIG. 11 is a representative screen image of the VS game livestreaming screen 600 displayed on the display of the user terminal 30*a* of the first viewer AU1 who has given the obstacle gift. When the first viewer AU1 taps the obstacle gift object 612 on the VS game livestreaming screen 600 of FIG. 10, the VS game livestreaming screen 600 of FIG. 11 is displayed. In response to the first viewer AU1 giving the obstacle gift to the first livestreamer LV1, the obstacle object 618 is displayed in the game interface GA2 of the second game played by the opponent, the second livestreamer LV2.

The first viewer AU1 may tap the shock gift object 614 in the gift display area 606 on the VS game livestreaming screen 600 of FIG. 10, and the viewer-side UI control unit 202 of the user terminal 30*a* receives designation of the shock gift object 614 by the first viewer AU1. The viewer-side communication unit 204 of the user terminal 30*a* generates a gift use signal including the gift ID of the shock gift represented by the designated shock gift object 614 and transmits the gift use signal to the server 10. The gift processing unit 308 and the payment processing unit 310 perform the processing of price payment and reward awarding for the shock gift as described above. The game processing unit 312 updates the VS livestream DB 322 to increase the value of the shock meter of the first livestreamer LV1. In the game interface GA1 of the VS game operating screen displayed on the user terminal 20*a* of the first livestreamer LV1, the first shock meter display area BM1 is updated to show an increase in the shock meter. In addition, in the game interface GA1 of the first video image display area 602 of the VS game livestreaming screen 600, the first shock meter display area BM1 is updated in the same manner. This allows the participants in the VS game livestream to recognize the increase in the shock meter of the first livestreamer LV1.

Figure 12:
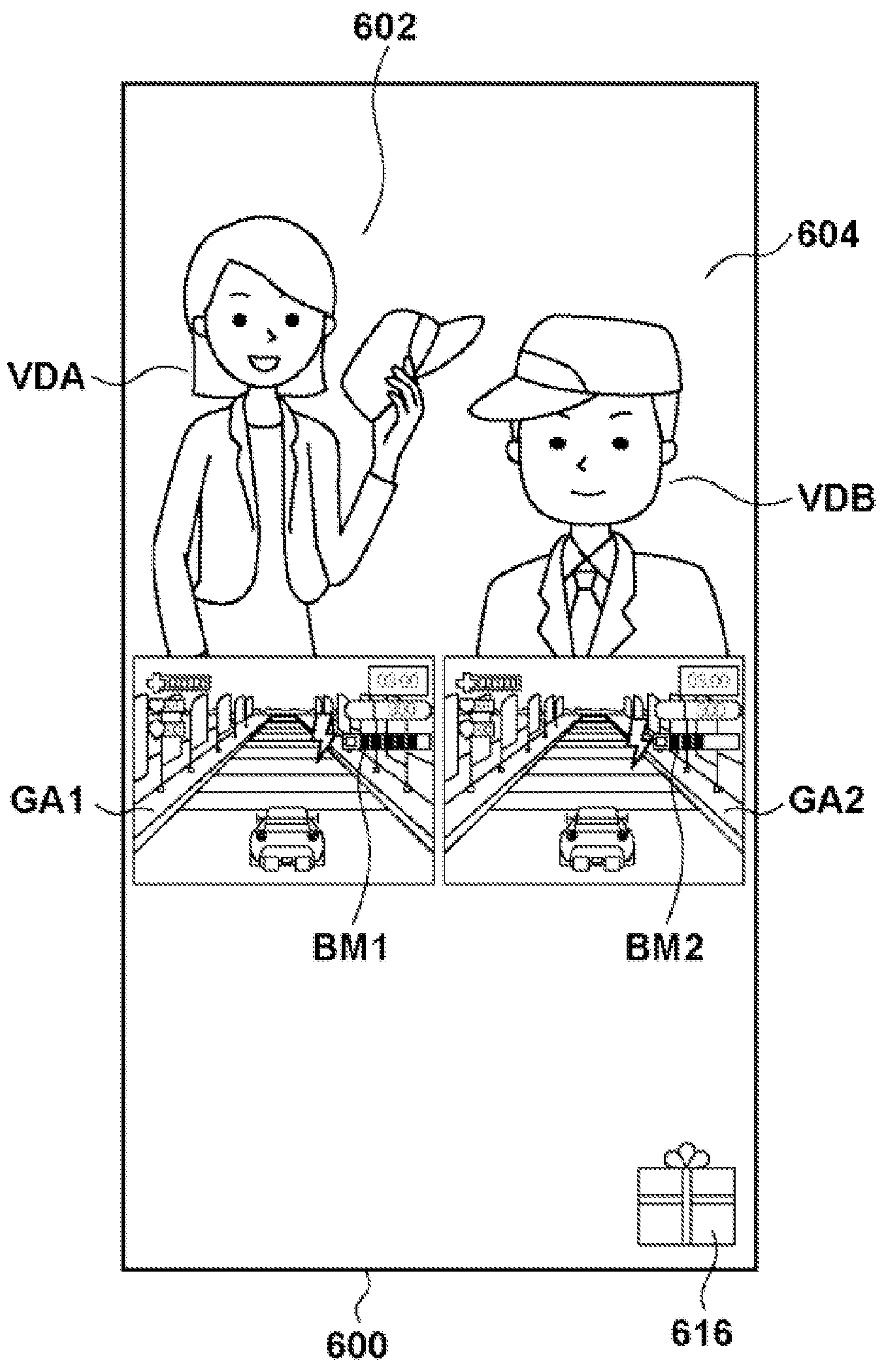
FIG. 12 is a representative screen image of the VS game livestreaming screen displayed on the display of the user terminal of the first viewer who has given a shock gift.

FIG. 12 is a representative screen image of the VS game livestreaming screen 600 displayed on the display of the user terminal 30*a* of the first viewer AU1 who has given the shock gift. When the first viewer AU1 taps the shock gift object 614 on the VS game livestreaming screen 600 of FIG. 10, the VS game livestreaming screen 600 of FIG. 12 is displayed. In response to the first viewer AU1 giving the shock gift to the first livestreamer LV1, the shock meter of the first livestreamer LV1 is increased, which is reflected in the shock meter display area BM1.

Figure 13:
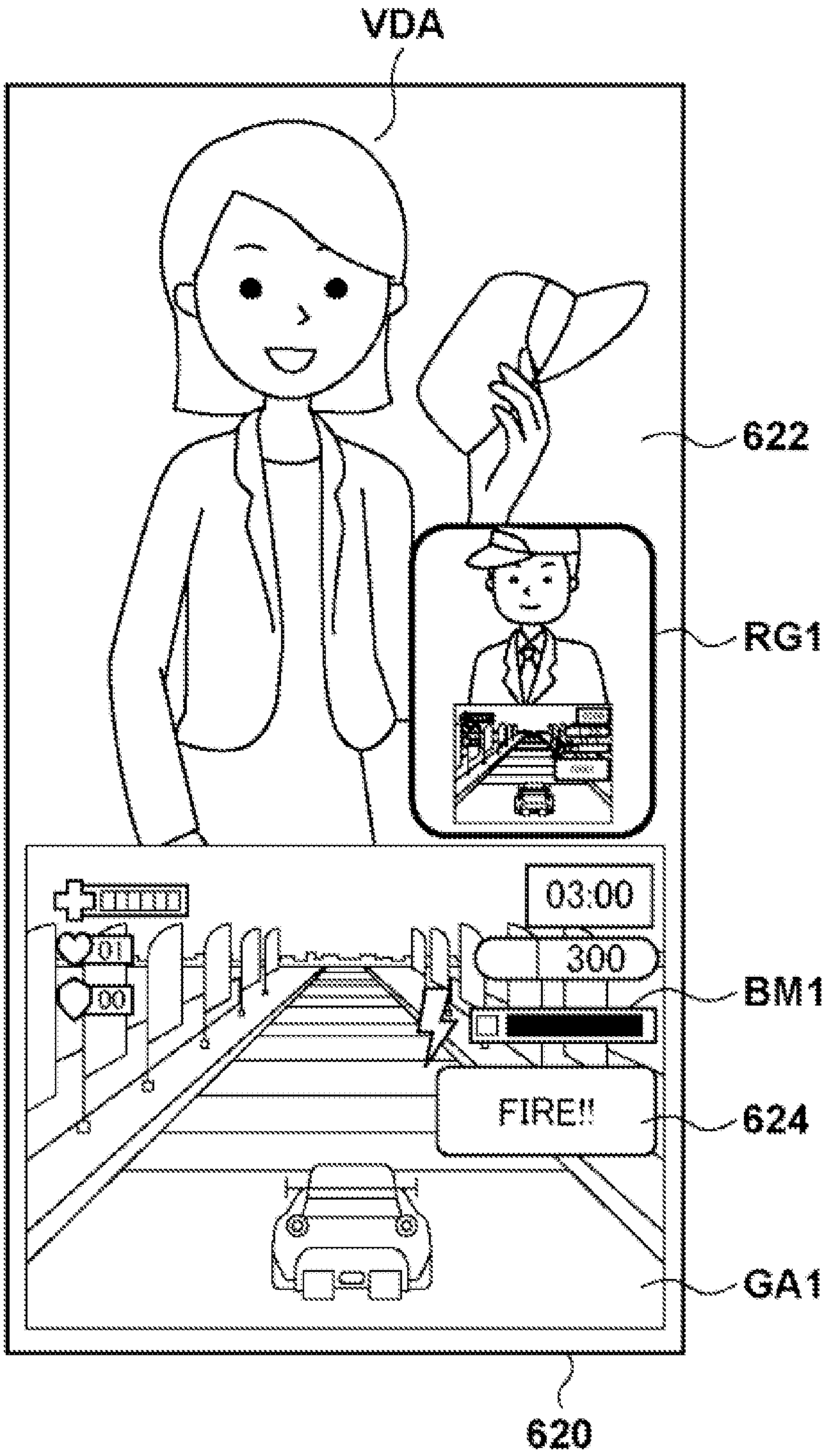
FIG. 13 is a representative screen image of a VS game operating screen displayed on the display of a user terminal of a first livestreamer when a shock meter has been full.

FIG. 13 is a representative screen image of the VS game operating screen 620 displayed on the display of the user terminal 20*a* of the first livestreamer LV1 when the shock meter has been full. The VS game operating screen 620 contains a third video image display area 622 and a small area RG1. In the third video image display area 622, the game interface GA1 of the first game played by the first livestreamer LV1 is superimposed on the video image VDA of the livestream of the first livestreamer LV1 participating in the VS game livestream. The small area RG1 displays a reduced-size image in which the game interface GA2 of the second game played by the second livestreamer LV2 is superimposed on the video image VDB of the livestream of the second livestreamer LV2 participating in the VS game livestream. When the shock meter of the first livestreamer LV1 has been full, the user terminal 20*a* starts to display the FIRE button 624 in the game interface GA1 to receive the instruction to activate the shock.

Figure 14:
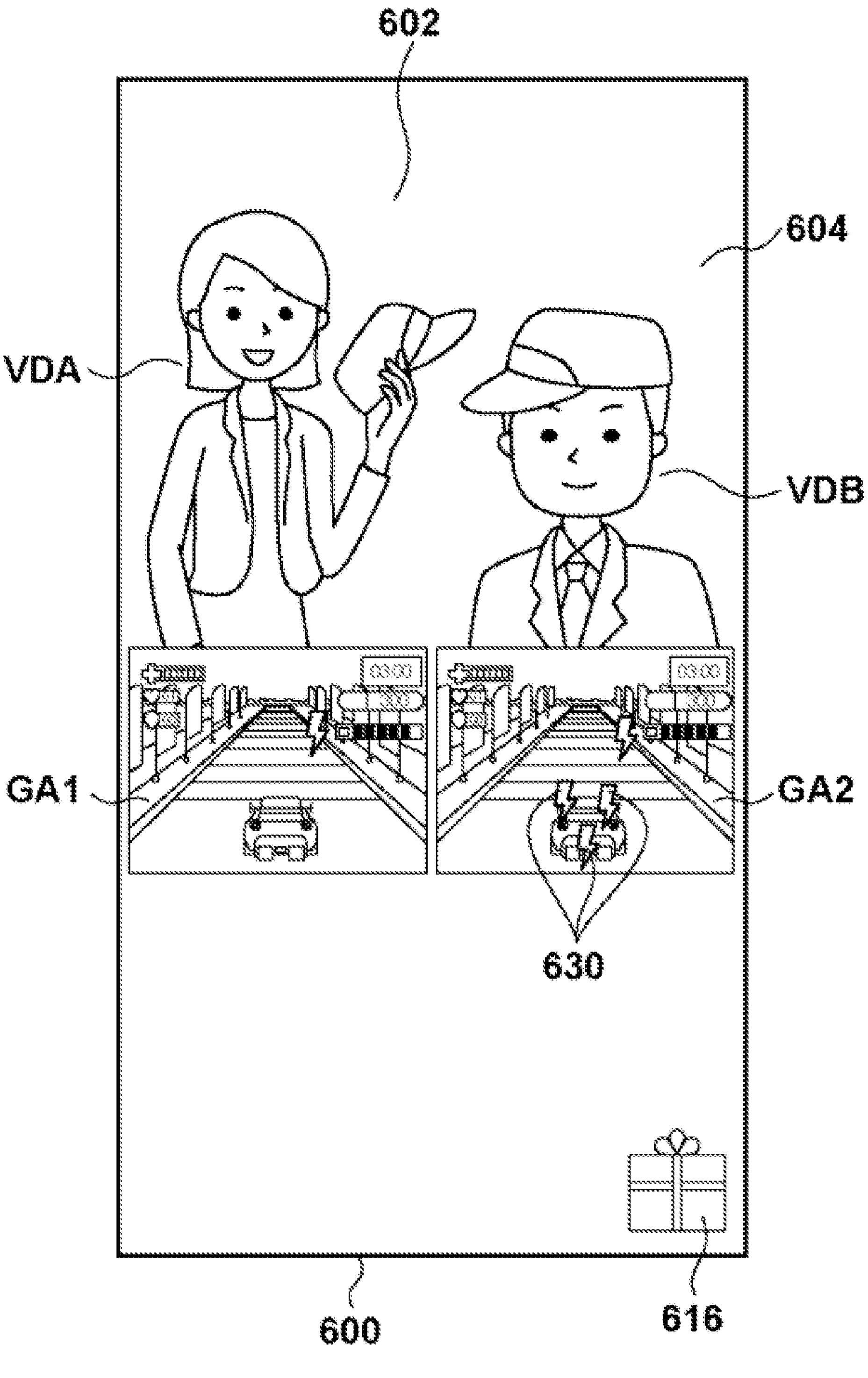
FIG. 14 is a representative screen image of the VS game livestreaming screen displayed on the display of the user terminal of the first viewer when the first livestreamer has made an instruction to activate a shock.

FIG. 14 is a representative screen image of the VS game livestreaming screen 600 displayed on the display of the user terminal 30*a* of the first viewer AU1 when the first livestreamer LV1 has made an instruction to activate the shock. When the first livestreamer LV1 taps the FIRE button 624 on the VS game operating screen 620 of FIG. 13, the user terminal 30*a* generates a shock activating request and transmits it to the server 10. The game processing unit 312 activates the negative impact corresponding to the received shock activating request, that is, temporary disablement of the car operation by the second livestreamer LV2. The game processing unit 312 also generates a shock effect display request and transmits it to the user terminals of the participants in the VS game livestream. When receiving the shock effect display request, the user terminal 30*a* of the first viewer AU1 displays the shock effect 630 in the game interface GA2 of the VS game livestreaming screen 600. The shock effect 630 is an effect corresponding to the disablement of car operation. When seeing the shock effect 630, the first viewer AU1 recognizes that the first livestreamer LV1 has activated the shock and the second livestreamer LV2 has been attacked by the shock.

In the above embodiment, the databases are stored on a hard disk or semiconductor memory, for example. It will be understood by those skilled in the art that each element or component can be realized by a CPU not shown, a module of an installed application program, a module of a system program, or a semiconductor memory that temporarily stores the contents of data read from a hard disk, and the like.

With the livestreaming system 1 according to this embodiment, a viewer can contribute to winning of his or her associated livestreamer in the VS game livestream by using the helping gifts and the attacking gifts. This strengthens the sense of unity between the viewer and the livestreamer, thereby livening up the livestream. The introduction of the attacking gifts also increases the variety of contributions that viewers can make, giving the competition more depth, which could be called strategy.

In a conventional VS livestream as disclosed in the '686 Publication, a viewer is a viewer of the VS livestream and not a viewer inherent to a livestreamer competing in the VS livestream. Thus, the concept of interfering with or attacking the game played by one of the livestreamers does not arise, although one can vote for which is better. The content of such a conventional VS livestream is monotonous. In contrast, in the VS game livestream according to this embodiment, a viewer is a viewer of one of the two livestreamers competing in the VS game livestream. Each livestreamer and his or her viewers are friends who together form a team or a community for defeating the opposing livestreamer. As means to do so, this embodiment provides helping gifts and attacking gifts. The viewers of one livestreamer work together, some to support the one livestreamer with helping gifts, some to interfere with the opponent by attacking gifts, thereby generally contributing to the winning of the one livestreamer. This allows for an interest and depth of strategy not found in conventional VS livestreams.

Figure 15:
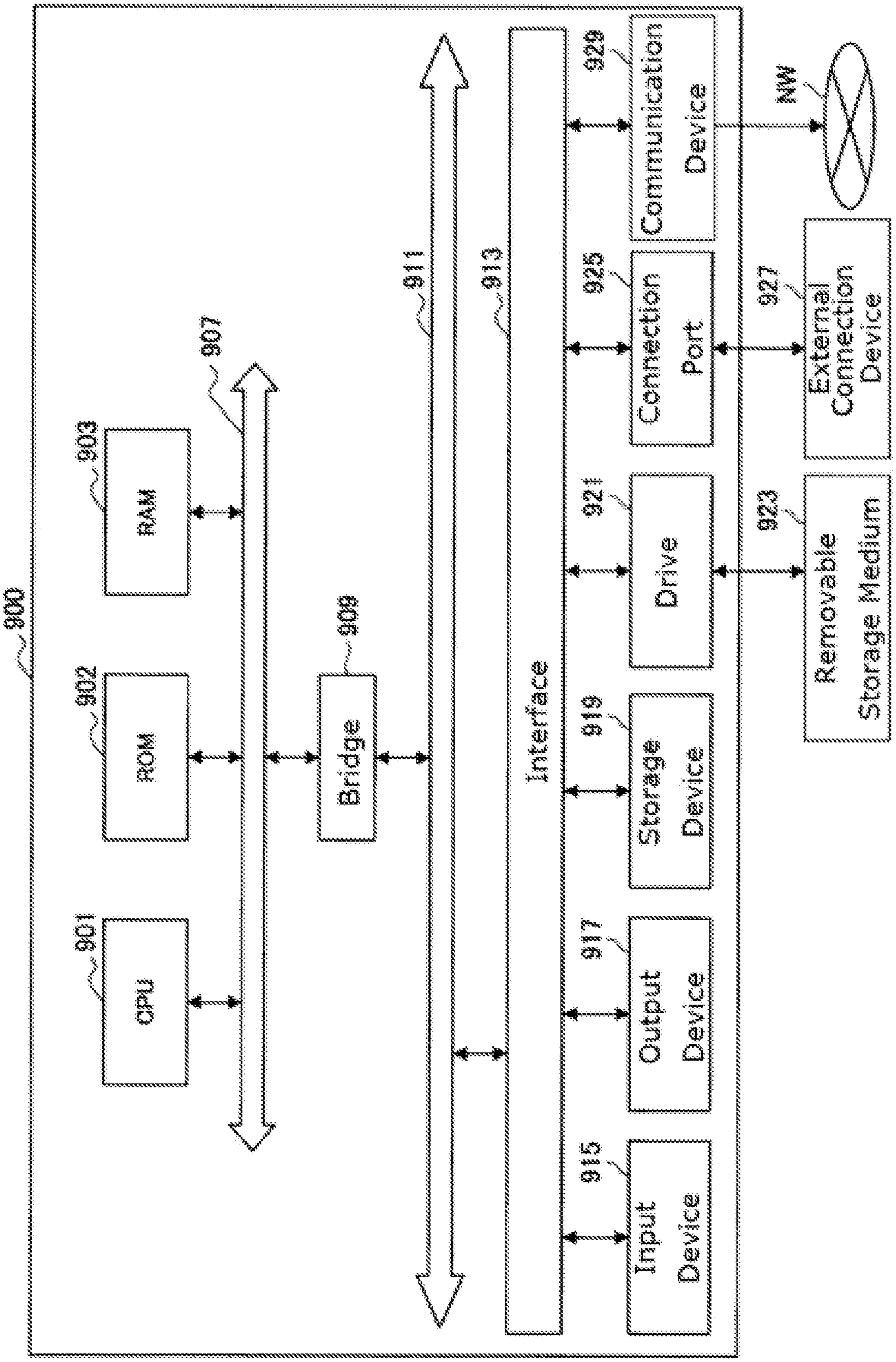
FIG. 15 is a block diagram showing an example of hardware configuration of an information processing device according to the first embodiment.

Referring to FIG. 15, the hardware configuration of an information processing device relating to an embodiment of the disclosure will be now described. FIG. 15 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the livestreaming unit 100, the image capturing control unit 102, the audio control unit 104, the video transmission unit 106, the livestreamer-side UI control unit 108, the livestreamer-side communication unit 110, the viewing unit 200, the viewer-side UI control unit 202, the viewer-side communication unit 204, the out-of-livestream processing unit 400, the out-of-livestream UI control unit 402, the out-of-livestream communication unit 404, the livestream information providing unit 302, the relay unit 304, the gift processing unit 308, the payment processing unit 310, the game processing unit 312, and the VS processing unit 316 may be embodied as circuitry programmed to realize such functions.

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs, calculation parameters, and the like used by the CPU 901. The RAM 903 serves as a primary storage that stores a program used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the livestreaming system 1 in the embodiment have been described. This embodiment is merely an example, and it will be understood by those skilled in the art that various modifications are possible by combining the respective components and processes, and that such modifications are also within the scope of the present disclosure.

In the embodiment, each livestreamer plays a single-player game within the VS livestream, but this example is not limitative. The technical ideas related to the embodiment can also be applied to the case in which other types of games are played. For example, competitive games or multiplayer games may be provided within the VS livestream. Examples of such games include blackjack, poker, and rock-paper-scissors. In the embodiment, a car racing game was used as the single-player game in the embodiment, but this example is not limitative. Other examples of the game that can be used include a rhythm game in which scores are given according to the accuracy of tempo, a quiz game, a game in which players imitate a model, or a falling block game.

In the embodiment, the server 10 may generate a ranking of users by the number of VS game wins held in the user DB 318. The server 10 may provide the generated ranking to the users or provide rewards to the users based on the ranking.

In the embodiment, the server 10 may perform processing to provide a larger negative impact as the price of an attacking gift is larger. In the example in FIG. 6, the gift "BS1" is an obstacle gift with price points of 1000, and the gift "BS2" is an obstacle gift with price points of 3000. The gift "BS2" may generate a larger obstacle, or an obstacle more difficult to avoid, than the gift "BS1." Alternatively, the gift "BS2" may have a longer effective time than the gift "BS1." Similarly, as for the shock gifts, the shock meter may be increased by a larger amount as the price points of a shock gift are larger.

In the embodiment, two livestreamers play against each other in a VS game livestream, but this example is not limitative. The technical ideas related to the embodiment can also be applied to a VS game livestream in which three or more livestreamers play against each other.

The conversion rate from the price points of a gift to a reward to be awarded in the embodiment is merely an example, and the conversion rate may be appropriately set by the administrator of the livestreaming system 1, for example.

The technical idea according to the embodiment may be applied to live commerce or virtual livestreaming using an avatar that moves in synchronization with the movement of the livestreamer instead of the image of the livestreamer.

The procedures described herein, particularly those described with a flow diagram or a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the livestreamer's user terminal. Also, the generation of the video data may be performed by the server 10.

What is claimed is:

1. A server comprising a circuitry, wherein the circuitry is configured to:

receive, from a first livestreamer terminal over a network, first operation information of a first game provided in a first livestream, the first operation information being generated based on an input by a first livestreamer delivering the first livestream;

receive, from a second livestreamer terminal over the network, second operation information of a second game provided in a second livestream, the second operation information being generated based on an input by a second livestreamer delivering the second livestream;

progress the first game based on the first operation information and progress the second game based on the second operation information;

transmit video data of the first livestream, data of the first game, video data of the second livestream, and data of the second game together to a first viewer terminal of a first viewer of the first livestream and a second viewer terminal of a second viewer of the second livestream over the network;

receive a signal indicating use of a gift by the first viewer from the first viewer terminal over the network;

update a value of a parameter associated with the first livestreamer in response to reception of the signal;

start waiting for an instruction from the first livestreamer terminal to exercise an impact by the first livestreamer when the value of the parameter has reached a threshold; and perform processing to negatively impact a result of the second game in response to reception of the instruction from the first livestreamer terminal.

2. The server of claim 1, wherein the circuitry is further configured to accomplish payment of a price of the gift by the first viewer in response to reception of the signal.

3. The server of claim 1, wherein the circuitry is further configured to determine one of the first livestreamer and the second livestreamer as a winner by comparing a result of the first game with the result of the second game.

4. The server of claim 2, wherein the circuitry is further configured to perform processing to provide a larger negative impact as the price of the gift is larger.

5. The server of claim 1, wherein the first game and the second game progress at least partially simultaneously, and wherein the first game and the second game are ended when a predetermined period common to both games has elapsed, or when the first livestreamer or the second livestreamer has fulfilled a predetermined condition.

6. The server of claim 1, wherein the parameter is a shock meter associated with the first livestreamer.

7. The server of claim 1, wherein the processing to negatively impact the result of the second game comprises temporarily disabling an operation in the second game by the second livestreamer.

8. A terminal of a viewer of a first livestream, comprising:

one or more processors; and memory storing one or more computer programs configured to be executed by the one or more processors, the one or more computer programs including instructions for:

causing a livestreaming screen to be displayed on a display, the livestreaming screen containing:

a first area displaying a video image of a first livestream on which an interface of a first game is superimposed;

a second area displaying a video image of a second livestream on which an interface of a second game is superimposed;

a first object for receiving use of a gift; and a second object showing a current value of a parameter configured to be updated by the use of the gift; and causing an effect to be displayed in the second area, the effect corresponding to a negative impact on the second game that is activated in response to an instruction from a terminal of a livestreamer delivering the first livestream, the instruction being allowed when a value of the parameter has reached a threshold.

9. A terminal of a livestreamer of a first livestream, comprising:

one or more processors; and memory storing one or more computer programs configured to be executed by the one or more processors, the one or more computer programs including instructions for:

causing a livestreaming screen to be displayed on a display, the livestreaming screen containing a first area displaying a video image of a first livestream on which an interface of a first game is superimposed;

starting to display an object for receiving an instruction to exercise a negative impact on a second game provided in a second livestream associated with the first livestream when a value of a parameter configured to be updated by use of a gift by a viewer of the first livestream has reached a threshold, and transmitting a signal corresponding to the instruction to a server to cause the server to negatively impact a result of the second game in response to the object receiving the instruction.

* * * * *